(12) United States Patent
Wollenhaupt et al.

(10) Patent No.: US 11,771,074 B2
(45) Date of Patent: Oct. 3, 2023

(54) SENSOR BASED OBSERVATION OF ANTHROPODS

(71) Applicant: Bayer Aktiengesellschaft, Leverkusen (DE)

(72) Inventors: Robert Wollenhaupt, Langenfeld (DE); Dennis Göke, Cologne (DE); Stefan Gröger, Odenthal-Eikamp (DE); Ernst-Georg Schmid, Duisburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 17/278,054

(22) PCT Filed: Sep. 16, 2019

(86) PCT No.: PCT/EP2019/074663
§ 371 (c)(1),
(2) Date: Mar. 19, 2021

(87) PCT Pub. No.: WO2020/058170
PCT Pub. Date: Mar. 26, 2020

(65) Prior Publication Data
US 2021/0360204 A1 Nov. 18, 2021

(30) Foreign Application Priority Data

Sep. 21, 2018 (EP) .................................. 18195871
Apr. 30, 2019 (EP) .................................. 19171993

(51) Int. Cl.
*A01M 1/02* (2006.01)
*A01M 1/10* (2006.01)
(Continued)

(52) U.S. Cl.
CPC .............. *A01M 1/026* (2013.01); *A01M 1/10* (2013.01); *G06F 18/214* (2023.01);
(Continued)

(58) Field of Classification Search
CPC .... G06K 9/6256; G06K 9/6277; G06V 20/52; A01M 1/026; A01M 1/02; A01M 1/04; A01M 1/14; H04N 7/188
See application file for complete search history.

(56) References Cited

U.S. PATENT DOCUMENTS 6,528,049 B2 * 3/2003 Light ..................... A01N 37/06
                                                        43/132.1
6,853,328 B1 * 2/2005 Guice ..................... G01S 7/411
                                                        342/28

(Continued)

FOREIGN PATENT DOCUMENTS

CN  103760847 A  4/2014
CN  107346424 A  11/2017

(Continued)

OTHER PUBLICATIONS

Chaudhry, M. et al. (2012) Studying the Effects of Wind on Insects, Poster, DOI: 10.13140/RG.2.1.3283.3521.

(Continued)

*Primary Examiner* — Philip P. Dang
(74) *Attorney, Agent, or Firm* — Morrison & Foerster LLP

(57) ABSTRACT

The present disclosure relates to the sensor based observation of arthropods in a region where plants grow. The subject matter of the present disclosure is a device, system, method and computer program product for the sensor based observation of arthropods, by means of a camera.

16 Claims, 4 Drawing Sheets

(51) Int. Cl.
  *H04N 7/18* (2006.01)
  *G06V 20/52* (2022.01)
  *G06F 18/214* (2023.01)
  *G06F 18/2415* (2023.01)
(52) U.S. Cl.
  CPC .......... *G06F 18/2415* (2023.01); *G06V 20/52* (2022.01); *H04N 7/188* (2013.01)

(56) References Cited

U.S. PATENT DOCUMENTS

| | | | | |
|---|---|---|---|---|
| 7,496,228 | B2* | 2/2009 | Landwehr | G06V 10/46 |
| | | | | 382/165 |
| 8,418,399 | B2* | 4/2013 | Palencia-Adrubau | |
| | | | | A01N 25/34 |
| | | | | 43/107 |
| 10,204,514 | B2* | 2/2019 | Baiden | G01J 1/0414 |
| 10,296,863 | B2* | 5/2019 | Bantas | G01N 33/0075 |
| 10,489,670 | B2* | 11/2019 | Diamond | G06V 20/20 |
| 10,989,724 | B1* | 4/2021 | Holmes | G01N 35/02 |
| 11,112,418 | B1* | 9/2021 | Holmes | G01N 35/04 |
| 11,366,116 | B1* | 6/2022 | Meagher | G01N 33/548 |
| 11,383,084 | B2* | 7/2022 | Yun | A61K 31/00 |
| 2016/0084863 | A1* | 3/2016 | Holmes | G01N 35/026 |
| | | | | 422/65 |
| 2017/0161450 | A1* | 6/2017 | White | G16H 40/67 |
| 2017/0223942 | A1* | 8/2017 | Frojmovics | G01N 21/59 |
| 2018/0168151 | A1* | 6/2018 | El-Sayed | A01P 19/00 |
| 2018/0303079 | A1* | 10/2018 | Marka | A01M 1/026 |
| 2019/0000059 | A1* | 1/2019 | Marka | A01M 31/002 |
| 2019/0350185 | A1* | 11/2019 | McGowan | G02B 13/06 |
| 2020/0037596 | A1* | 2/2020 | Peters | G01S 17/89 |
| 2021/0378225 | A1 | 12/2021 | Göke et al. | |

FOREIGN PATENT DOCUMENTS

| | | |
|---|---|---|
| KR | 20100127473 A | 12/2010 |
| WO | 0217119 A2 | 2/2002 |
| WO | 2018054767 A1 | 3/2018 |
| WO | 2018065308 A1 | 4/2018 |
| WO | WO/2020/058175 | 3/2020 |

OTHER PUBLICATIONS

Fournier, F. et al. (Dec. 2005) "Effect of Barometric Pressure on Flight Initiation by Trichogramma pretiosum and Trichogramma evanescens (Hymenoptera: Trichogrammatidae)," Environmental Entomology, 34(6): 1534-1540.

International Search Report dated Jan. 28, 2020 for PCT Application No. PCT/EP2019/074663, filed Sep. 16, 2019, 3 pages.

Lopez, O. et al. (2021) "Monitoring Pest Insect Traps by Means of Low-Power Image Sensor Technologies," Sensors, 12:15801-15819.

Raman, R. et al. (2007) "Detecting Insect Flight Sounds in the Field:Implications for Acoustical Counting of Mosquitoes," American Society of Agricultural and Biological Engineers, 50(4):1481-1485.

Signaling and Communication in Plant, Series Ed.: C. Garcia-Mata, 2015, Springer ISSN: 1867-9048.

Wellington, W.G. et al. (1946) "The Effects of Variations in Atmospheric Pressure Upon Insects," Canadian Journal of Research, 24:51-40.

Wiktelius, S. (1981) "Wind Dispersal of Insects," Grana 20(3):205-207.

Witzany, G. et al. (Jul./Aug. 2006) "Plant Communication from Biosemiotic Perspective—Differences in Abiotic and Biotic Signal Perception Determine Content Arrangement of Response Behavior. Context Determines Meaning of Meta-, Inter- and Intraorganismic Plant Signaling," Plant Signaling & Behavior 1(4):169-178.

U.S. Appl. No. 17/278,219, filed Mar. 19, 2021, for Göke et al. (Also cited as U.S. Publication No. 2021-0378225 A1) (U.S Patent Application is not submitted herewith pursuant to the waiver of 37 C.F.R. § 1.98(a)(2)(iii) issued by the Office on Sep. 21, 2004.).

Chaudhry, M. et al. (2016) Studying the Effects of Wind on Insects, Poster, DOI: 10.13140/RG.2.1.3283.3521.

* cited by examiner

SENSOR BASED OBSERVATION OF ANTHROPODS

CROSS REFERENCE TO RELATED APPLICATIONS

This application is a national stage application under 35 U.S.C. § 371 of International Application No. PCT/EP/2019/074663, filed internationally on Sep. 16, 2019, which claims the benefit of priority to European Application Nos 18195871.1, filed Sep. 21, 2018 and 19171993.9, filed Apr. 30, 2019.

FIELD OF DISCLOSURE

The present disclosure is concerned with sensor-assisted observation of arthropods in an area in which plants grow. The present disclosure provides an apparatus, a system, a method and a computer program product for sensor-assisted observation of arthropods by means of a camera.

BACKGROUND

About two thirds of the species currently known are arthropods (phylum of Arthropoda), 85% of which are insects. A considerable proportion of arthropods is phytophagous: these animals feed on plants and can lead to impairment of growth, cause suction and biting damage, and transmit viral diseases. This causes, for example, considerable losses of yield and quality in the growing of crop plants.

As well as these pests, there are arthropods that are beneficial in the growing of crop plants. Such beneficials may be natural opponents of pests in that they decimate the stocks of pests or prevent their further reproduction because the pests serve as food for them or their offspring. Other beneficials are essential to the propagation of plants: honeybees, bumblebees, flies and butterflies in particular take up pollen from a flower in the search for nectar, transfer it to adjacent flowers and hence ensure pollination.

In modern agriculture, an important role is played by the detection and recognition of beneficials and/or pests within areas utilized agriculturally.

For control of infestation in relation to pests, sticky color tablets or yellow trap dishes are frequently used. Many pests, for example rape seed pests, are attracted by the yellow color of the dish or tablet. The yellow trap dish is filled with water to which a surfactant can be added in order to lower surface tension such that pests attracted are drowned. In the case of a sticky tablet, the pests remain stuck to the glue. The traps are monitored regularly. By counting the number of pests present in a trap, it is possible to ascertain damage thresholds. However, counting is laborious and prone to error.

WO2018/054767 discloses a system comprising a trap for harmful organisms, a smartphone and a server. A farmer can use the smartphone to generate digital images of the contents of the trap. The images are transmitted via a communications network to a server, where they are evaluated. The farmer receives a message from the server as to the number and species of the harmful organisms trapped. A disadvantage of the system disclosed in WO2018/054767 is that traps have to be sought out by a human to be able to conduct an infestation check.

KR1020100127473 discloses a system comprising a trap that attracts insects with the aid of an attractant (pheromone), a camera that produces images of the insects present in the trap, a transmitter unit for transmission of the images wirelessly to an analysis unit, and the analysis unit for analysis of the images. The trap can thus be monitored remotely. The trap is equipped with an adhesive layer in order to immobilize insects. More and more insects, but also soil, collect on the adhesive strip over time, such that the trap has to be sought out from time to time in order to renew the adhesive layer.

The same applies to trap dishes filled with water; here too, the trap dish has to be sought out from time to time in order to clean it and fill it with fresh water.

SUMMARY OF DISCLOSURE

If insects are not immobilized by water or an adhesive layer, the insects can leave the "trap" again. In order to be able to carry out an infestation check, images have to be taken constantly in order not to miss any insects that get into the "trap". This firstly increases the energy consumption of the camera; secondly, very many images showing no insects at all are generated and possibly sent to the analysis unit and/or analyzed.

The present disclosure is dedicated to the abovementioned problems.

According to some embodiments, the present invention provides an apparatus comprising
a collecting region,
an imaging unit,
a transmitter unit,
a control unit and
a sensor
wherein the sensor is configured to
detect a physical property in its environment that correlates with the probability of the presence of an arthropod in the collecting region, and
convert the property detected to a signal,
wherein the control unit is configured to
trigger the imaging unit to generate images of the collecting region, and
trigger the transmitter unit to send the images and/or information regarding the images via a network to a computer system,
wherein the control unit is configured to
fix the times at which and/or the frequency in time in which the images are generated and/or at/in which the images and/or information regarding the images are sent to the computer system via the network, on the basis of the signal from the sensor.

According to some embodiments, the present invention further provides a system, wherein the system comprises at least one apparatus of the invention and a computer system, wherein the at least one apparatus of the invention and the computer system are connected to one another via a network.

According to some embodiments, the present invention further provides a method comprising the steps of
detecting a physical property in the environment of a collecting region, wherein the physical property correlates with the probability of the presence of an arthropod in the collecting region,
generating images of the collecting region and
sending the images and/or information regarding the images via a network to a computer system,
wherein the times and/or the frequency in time for the generation of images of the collecting region and/or for the sending of the images and/or the information regarding the images via a network to the computer system is/are fixed depending on the probability that one or more arthropods are present in the collecting region.

According to some embodiments, the present invention further provides a computer program product comprising a computer program which can be loaded into a memory of a computer, where it triggers the computer to execute the following steps:

receiving a signal, wherein the signal includes information as to the probability that an arthropod is present in a collecting region, controlling the generation of images of the collecting region and the sending of the images and/or of information regarding the images via a network to a computer system, wherein the times and/or the frequency in time for the generation of the images of the collecting region and/or for the sending of the images and/or the information regarding the images via a network to the computer system is/are fixed depending on the probability that arthropods are present in the collecting region.

The invention is elucidated in detail hereinafter without distinguishing between the subjects of the invention (device, system, method, computer program product). The elucidations that follow shall instead apply analogously to all subjects of the invention, regardless of the context in which they are made (device, system, method, computer program product).

If the present description or the claims cite steps in any sequence, this does not necessarily mean that the invention is limited to the sequence specified. Instead, it is conceivable that the steps are also executed in a different sequence or else parallel to one another, unless one step builds on another step, which necessitates that the step that builds on the previous step is executed subsequently (but this will become clear in the specific case). The sequences mentioned are thus preferred embodiments of the invention.

With the aid of the present disclosure, it is possible to determine the presence of pests and/or beneficials simply and efficiently in an area.

A "pest" is preferably understood to mean an arthropod which can appear in the growing of crop plants and damage the crop plant, or adversely affect the harvest of the crop plant.

The pest is preferably an animal pest from the group of the insects (in the various stages from larva (caterpillar, pseudo-caterpillar) up to the adult stage) or arachnids. The pest is more preferably an agricultural pest, for example codling moth, aphid, thrips, summer fruit tortrix, Colorado potato beetle, cherry fruit fly, cockchafer, European corn borer, plum fruit moth, rhododendron leafhopper, turnip moth, scale insect, gypsy moth, spider mite, European grapevine moth, walnut husk fly, glasshouse whitefly, oilseed rape stem weevil, cabbage stem weevil, rape pollen beetle, cabbage shoot weevil, brassica pod midge or cabbage stem flea beetle, or a forestry pest, for example aphid, steelblue jewel beetle, bark beetle, oak splendour beetle, oak processionary moth, green oak tortrix, spruce webworm, common furniture beetle, great brown bark eater, common pine sawfly, pine beauty, pine looper, lesser spruce sawfly, pine moth, horse chestnut leaf miner, gypsy moth or brown powderpost beetle.

The term "crop plant" is understood to mean a plant which is specifically grown as a useful or ornamental plant by human intervention.

A "beneficial" is preferably understood to mean an arthropod for which a pest serves as food source or host, or which is important for a successful harvest for other reasons (for example as a pollinator). The beneficial is preferably an insect (in the various stages from larva (caterpillar, pseudo-caterpillar) up to the adult stage) or an arachnid. The beneficial is most preferably a pollinator, for example a honeybee, bumblebee, fly or butterfly.

Pests and beneficials are also referred to collectively in this description as arthropods (Latin: Arthropoda). The term "arthropods" can thus have the meaning of "pests", can have the meaning of "beneficials", can have the meaning of "pests or beneficials", and can have the meaning of "pests and beneficials". The term "(specific) arthropod" may have the meaning of arthropods or the meaning of specific arthropods; this is also analogously true of the terms "(specific) pest" and "(specific) beneficial".

An "area" is understood to mean a spatially delimitable region of the Earth's surface on which plants grow. Preferably, the area is at least partly utilized agriculturally in that crop plants are planted in one or more fields, are supplied with nutrients and are harvested. The area may also be or comprise a silviculturally utilized region of the Earth's surface (for example a forest). Gardens, parks or the like in which vegetation exists solely for human pleasure are also covered by the term "area".

The presence of pests and/or beneficials in an area is ascertained using at least one device of the invention; preference is given to distributing two or more devices of the invention in the area. Preference is given to setting up or hanging up two or more devices of the invention in one or more fields of a specific crop plant (e.g. oilseed rape, grapes, potatoes, fruit or the like) or in stands of specific plants (e.g. oak forest), since such areas have characteristic fauna. Preference is given to analyzing the fauna (pests/beneficials) living in the areas by executing the invention.

With the aid of a device of the invention, it is possible to ascertain which pest/beneficials and how many pests/beneficials are present in the area in which the device has been set up.

According to some embodiments, it is conceivable that a device of the invention generates images both of pests and of beneficials. It is alternatively conceivable that different devices are used, one type of which is set up to generate images of (specific) pests and another type to generate images of (specific) beneficials.

According to some embodiments, a device of the invention comprises a collecting region, an imaging unit, a transmitter unit, a control unit and a sensor.

The collecting region is a region that can be sought out by arthropods (beneficials and/or pests). This may be a flat surface of a tablet or card or the like. It may also be the base of a vessel.

According to some embodiments, it is conceivable that a device of the invention has multiple collecting regions. According to some embodiments, it is also conceivable that a device of the invention has various collecting regions, for example a collecting region for (specific) pests and another collecting region for (specific) beneficials.

The collecting region is preferably a flat surface with a round, oval, elliptical, angular (triangular, tetragonal, pentagonal, hexagonal or generally n-angular, with n as an integer greater than or equal to three) cross section. Preferably, the cross section is round or rectangular (especially square). The walls may extend upward from the surface, so as to result in a vessel. The vessel may, for example, be in cylindrical, conical or box-shaped form. It preferably has a round cross section, and the walls extend conically upward from the base, with base surface and wall surface preferably running at an angle of more than 90° and less than 120° relative to one another.

In a preferred embodiment, there is at least one outflow in the base region, such that, for example, rainwater that gets into the collecting region can flow out of the collecting region via the at least one outflow. The outflow may be one or more openings in the base or in a wall adjoining the base. It is conceivable that a gutter is mounted at such an opening in order to steer the water flowing out in a defined direction.

The collecting region may be part of a trap device for pests, for example a yellow trap dish or an optionally sticky color tablet.

As attractant, the collecting region may be configured in a color (for example yellow or red) that attracts specific pests and/or beneficials. As well as or instead of a color, it is possible for further/other means that attract arthropods to be present (attractants). A conceivable example is the use of a pheromone or a fragrance that simulates a food source, for example. Also conceivable is the use of a source of electromagnetic radiation in the infrared, visible and/or ultraviolet region for attraction of (specific) arthropods. Also conceivable is the use of noises that imitate, for example, males and/or females ready to mate. Also conceivable is the use of specific patterns that imitate a plant, for example.

Preference is given to using one or more attractants that achieve a constant effect at least over the period between setup of the imaging device and a first maintenance. Since a color, a pattern, a shape or the like as attractant generally remains constant over such a period, they have an advantage over a pheromone that can evaporate off quickly.

In the case of use of a trap dish, this may be filled with water and optionally with one or more additions. Such an addition may, for example, be a surfactant for lowering surface tension. Such an addition may also be an attractant for attracting (specific) arthropods. Such an addition may also be a means of preventing algae formation (for example a herbicide).

In the case of a card or tablet, this may be provided with an adhesive in order to render pests immobile. In the case of a collecting region for beneficials, preference is given to dispensing with an adhesive or other means that could harm the beneficials.

According to some embodiments, in the case of the device of the invention, preference is given to dispensing with means of immobilizing and/or of trapping arthropods; this means that the device is preferably not provided with an adhesive layer, and that the device preferably does not have any liquid for trapping arthropods.

According to some embodiments, it is conceivable that the device of the invention has means of cleaning the collecting region. It is conceivable that soil collects in the collecting region over time, which makes it difficult to identify and count pests and/or beneficials. Such cleaning means may, for example, be one or more nozzles from which compressed air is blown onto the collecting region in order to blow soil away. These may be one or more nozzles from which a liquid (e.g. water, optionally with one or more additions, for example a surfactant) can be sprayed onto the collecting region in order to flush soil away. This may be an actuator that moves or rotates the surface of the collecting region to the side for soil to fall away from the surface. It is conceivable that there is a vibration mechanism that moves the collecting region back and forth and/or up and down in order to detach adhering soil. It is conceivable that two or more of the means mentioned and/or further means are combined with one another.

Preferably, the device of the invention, according to some embodiments, has means by which the device can be located on a ground surface or in a ground surface. The device can preferably be secured in the ground surface in order to prevent it from falling over, for example in a storm. There are preferably means by which the distance between ground surface and collecting region can be varied. One example of such a height adjustment is a telescopic rod that can be secured in the ground surface by one end, and the collecting region can be mounted at the other end thereof. Another example of a height adjustment is a lifting platform. Such a variable height adjustment enables positioning of the collecting region above plants, such that flying insects can recognize the collecting region when flying over the plants. The variable height adjustment allows adjustment of the height of the collecting region (distance from the ground surface) to the growing plants in order to prevent the surrounding plants from covering the collecting region. In a preferred embodiment, the height adjustment is automatic. It is preferably adjusted such that the collecting region is always above or at the height of the surrounding plants. This can be accomplished by distance sensors and/or brightness sensors.

According to some embodiments, it is alternatively conceivable that the device of the invention has means by which it can be secured to a plant, for example a hook or a loop or a belt for securing to a twig or branch or stem.

According to some embodiments, the device of the invention further comprises one or more imaging units. Such an imaging unit can be used to generate digital images. An imaging unit comprises an image sensor and optical elements. The image sensor is a device for recording two-dimensional images from light by electrical means. This typically comprises semiconductor-based image sensors, for example CCD (CCD=charge-coupled device) or CMOS sensors (CMOS=complementary metal-oxide-semiconductor). The optical elements (lenses, stops and the like) serve for maximum sharpness of imaging of the object of which a digital image is to be generated on the image sensor.

The imaging unit is positioned such that the entire collecting region or at least part of the collecting region is imaged on the image sensor. It is conceivable to use multiple imaging units that image different regions of the collecting region on the respective image sensor. In the case of such a use of multiple imaging units, it is advantageous when the regions imaged at least partly overlap, in order to be able to generate an overall image in a simpler manner from the individual images at a later juncture.

According to some embodiments, the device of the invention preferably has a holder on which the imaging unit is fixed or can be reversibly fixed. The holder is preferably at a defined and constant distance from the collecting region, and hence ensures a defined and constant distance between the image sensor and the collecting region.

It is conceivable that a grid or mesh (generally referred to as barrier) that prevents leaves or the like (soil) from getting into the collecting region is mounted above the collecting region. The sides of the collecting region preferably remain clear, so that pests and/or beneficials can get into the collecting region from the sides. It is alternatively conceivable that the mesh size of the mesh or the grid spacing is of such dimensions that only (specific) pests and/or (specific) beneficials get through; in such a case, the mesh or grid may also extend over the side region.

It is alternatively conceivable that, according to some embodiments, in a case of a device of the invention that serves exclusively for generation of images of specific pests, a collecting region for these pests which is inaccessible to (specific) beneficials is created. This too can be achieved with the aid of a barrier. The barrier may be mounted on the collecting region or the vessel so as to give rise to an interior including the collecting region separated from the environment by the barrier: a specific pest can get into the interior only through the barrier; the barrier is designed such that many beneficials cannot penetrate it since they are too large. One conceivable example is one or more openings through which only arthropods having a size that does not exceed a maximum size can get into the collecting region.

The imaging unit is preferably within the interior which is formed by the vessel and the barrier.

For imaging of the collecting region on one or more image sensors, a light source with which the collecting region is illuminated is required, such that light (electromagnetic radiation in the infrared, visible and/or ultraviolet region of the spectrum) is scattered/reflected by the illuminated collecting region in the direction of the imaging unit. For this purpose, it is possible to use daylight. Alternatively, it is conceivable to use a lighting unit that ensures a defined illumination independent of daylight. It is preferably mounted laterally alongside the imaging unit, such that no shadows of the imaging unit are thrown onto the collecting region.

It is also conceivable to position an illumination source beneath the collecting region and/or alongside the collecting region, which illuminates the collecting region "from below" and/or "from the side", whereas an imaging unit produces one or more digital images "from the top". Such an arrangement is suitable especially when only the number of arthropods present in the collecting region (or an area density) is to be determined from one or more images; illumination from below makes the usually dark arthropods stand out very well against the bright illumination unit. However, this assumes that the base of the vessel that forms the collecting region is at least partly transparent to the electromagnetic radiation used. If a determination of species present is to be performed from one or more images, it may be necessary to allow light (from above and/or from the side) to hit and be scattered by the arthropods, which then reaches the image sensor.

It is conceivable that multiple illumination sources illuminate the collecting region from different directions.

It is conceivable that the electromagnetic spectrum of the light emitted for illumination is matched to the color of specific pests and/or specific beneficials and/or the color of the collecting region, in order to produce a maximum contrast between the arthropods and the background against which they are imaged.

In a preferred embodiment, the illumination and/or color and/or surface characteristics of the collecting region is chosen such that the electromagnetic radiation used for illumination is reflected or scattered more significantly by the arthropods than by the collecting region. In an alternative embodiment, the illumination and/or color and/or surface characteristics of the collecting region is chosen such that the electromagnetic radiation used for illumination is reflected or scattered more significantly by the collecting region than by the arthropods. Both cases ensure high contrast.

In a particularly preferred embodiment, light of a spectral region for which the (specific) arthropods have a comparatively low absorption and transmission capacity but a high reflection and scattering capacity is used. Preferably, the vast majority of electromagnetic radiation that hits the arthropods is reflected or scattered thereby, and a small proportion is absorbed or transmitted. This facilitates the identification of the species present.

The collecting region preferably has a rough surface in order to avoid direct reflections of daylight from the collecting region onto the image sensor.

The term "light" and "illumination", incidentally, is not supposed to mean that the spectral region is limited to visible light (about 380 nm to about 780 nm). It is likewise conceivable that illumination is effected using electromagnetic radiation having a wavelength below 380 nm (ultraviolet light: 100 nm to 380 nm) or above 780 nm (infrared light: 780 nm to 1000 µm). The image sensor and the optical elements are matched to the electromagnetic radiation used.

According to some embodiments, the device of the invention further comprises a control unit. The control unit triggers the at least one imaging unit to record digital images.

The control unit may be configured to route the images recorded to the transmitter unit in order to send them via a radio network to a separate computer system. The images can then be viewed and/or analyzed (in an automated manner) on the computer system.

According to some embodiments, it is alternatively conceivable that the device of the invention has an analysis unit configured to analyze the images generated in an automated manner. The analysis may serve to ascertain the number of pests and/or beneficials present in the collecting region. The analysis may also serve to identify the species of pests and/or beneficials present in the collecting region.

The transmitter unit of the device of the invention is configured to send information relating to the one or more images via a network to a computer system. This information may be the one or more images themselves. It is alternatively conceivable that this information is the results of the analysis by the evaluation unit, i.e. the number of pests and/or beneficials present and/or the species identified in each case. It is also conceivable that an alarm signal is sent if the automated analysis of at least one image shows that a specific pest has been identified and/or the number of (specific) pests and/or (specific) beneficials has gone above or below a predefined threshold.

The transmitter unit may be configured such that it transmits information via a mobile communications network (e.g. GSM: *Global System for Mobile Communications*, GPRS: *General Packet Radio Service*; UMTS: *Universal Mobile Telecommunications System*, LTE: *Long Term Evolution*), via a WLAN (*Wireless Local Area Network*), via Bluetooth, via DECT (*Digital Enhanced Cordless Telecommunications*) via a low-power wide-area network (LPWAN or LPN)), for example a NarrowBand IoT network and/or via a combination of different transmission routes.

In a preferred embodiment, the transmitter unit is configured such that it transmits the information via a short-range radio link to a base station, from which the information is then transferred to cable and/or passed on by radio.

In a further preferred embodiment, multiple devices of the invention form a mesh, meaning that information is passed from one device to another. A specific device is ultimately present close to a base station, or has means of transferring the information over a greater distance than the distance between the individual devices that form the mesh.

According to some embodiments, the device of the invention further comprises at least one sensor, A "sensor", also referred to as detector, (measurement parameter or measurement) transducer or (measurement) sensor, is a technical component capable of qualitatively detecting or quantitatively detecting, as a measurement parameter, the particular physical or chemical property and/or the physical characteristics of its environment. These parameters are detected by means of physical or chemical effects and transformed to a further-processible, usually electrical or optical signal.

According to some embodiments, the sensor of the device of the invention detects a physical property in its environment that correlates with the probability of the presence of an arthropod in the collecting region.

"Environment" means at a maximum distance from the sensor of preferably not greater than 10 meters, more preferably not greater than 1 meter, more preferably not greater than 10 cm, from the collecting region.

"Correlation" means that the probability of the presence of an arthropod in the collecting region changes when the physical property changes. The probability of the presence of an arthropod in the collecting region may become greater here when the value of the physical property becomes greater within a defined range of values, and smaller when the value of the physical property becomes smaller within the defined range of values (positive correlation). The probability of the presence of an arthropod in the collecting region may alternatively become smaller when the value of the physical property becomes greater within a defined range of values, and greater when the value of the physical property becomes smaller within the defined range of values (negative correlation). The correlation may be linear or nonlinear within a range of values. The correlation is preferably characterized by a correlation coefficient in the range from 0.5 to 1. The correlation is preferably characterized by a causal relationship.

The sensor converts one or more values that represent(s) the physical property to a signal. The signal is transmitted to the control unit. The expression "transmission" includes the operation of the control unit calling for the signal from the sensor. The expression "signal" means that information is transmitted from the sensor to the control unit, which is interpreted by the control unit. The signal may be an analog or digital signal. It is conceivable that there are multiple sensors that transmit multiple signals to the control unit.

A signal typically leads to an action by the control unit.

In one embodiment of the present invention, the control unit, on the basis of at least one signal, stipulates the times at which the imaging unit generates images of the collecting region.

In a further embodiment of the present invention, the control unit, on the basis of at least one signal, stipulates the frequency in time with which the imaging unit generates images of the collecting region.

In a further embodiment of the present invention, the control unit, on the basis of at least one signal, stipulates the times at which and the frequency in time with which the imaging unit generates images of the collecting region.

In a further embodiment of the present invention, the control unit, on the basis of at least one signal, stipulates the times at which the transmitter unit transmits the images and/or information regarding the images via a network to the computer system.

In a further embodiment of the present invention, the control unit, on the basis of at least one signal, stipulates the frequency in time with which the transmitter unit transmits the images and/or information regarding the images via a network to the computer system.

In a further embodiment of the present invention, the control unit, on the basis of at least one signal, stipulates the times at which and the frequency in time with which the transmitter unit transmits the images and/or information regarding the images via a network to the computer system.

The signal includes information regarding the probability that a (specific) pest and/or a (specific) beneficial is present in the collecting region and/or the signal correlates with the probability that a (specific) pest and/or a (specific) beneficial is present in the collecting region.

Times at which the imaging unit generates images of the collecting region and/or at which the transmitter unit transmits the images and/or information regarding the images via a network to the computer system may be fixedly predefined times or times that can be ascertained, for example 12 o'clock midday on a particular day or on a particular day of the week or every day. The control unit may be configured such that it ascertains (e.g. calculates) the particular times on the basis of at least one signal. It is also conceivable that the control unit is configured such that it selects particular predefined times on the basis of the at least one signal from a list of predefined times. Also conceivable is a combination of ascertaining and selecting.

Times at which the imaging unit generates images of the collecting region and/or at which the transmitter unit transmits the images and/or information regarding the images via a network to the computer system may also be triggered by events. It is conceivable, for example, that the at least one signal indicates the occurrence of a defined event and the control unit ascertains and/or selects one or more times on the basis of the event that has occurred. It is conceivable that the occurrence of an event triggers the generation of an image of the collecting region and/or the transmission of the image and/or information regarding the image via a network to the computer system.

The expression "frequency in time" is understood to mean a rate with which images are generated and/or images and/or information regarding the images is/are transmitted to a computer system. This may be a regular rate (once per day, once per hour, once per week, every 10 minutes etc.) or an irregular rate, in the case of which, however, an average can be specified (e.g. arithmetic average). The frequency in time may also assume the value of "zero"; in such a case, at least over a defined period of time (that can be fixed by defined times), no images are generated and/or no images and/or information regarding the images is/are transmitted to a computer system.

The sensor can fix a combination of times and frequencies in time, for example every 10 minutes between 5:00 and 21:00 hours, or every hour whenever a particular first event occurs and once per day whenever a particular second event occurs.

The sensor may, for example, be a timer. There are arthropods that are active solely at particular times of day or night. The probability that such an arthropod will be in the collecting region at the particular time of day or night is thus greater than at other times of day or night. Using the timer, the control unit can stipulate that images are generated and/or information is transmitted, for example, only during a defined period of the day or night.

According to some embodiments, the device of the invention preferably has at least one sensor that is not a timer.

The sensor may, for example, be a brightness sensor that detects the brightness around the collecting region or in the collecting region or around the device of the invention as a physical property. There are arthropods that are active only or preferably under particular brightness conditions (for example moths preferably in darkness). The brightness sensor used may be a photocell or a photodiode. These can be used to measure the intensity of light in a specific wavelength range.

The sensor may, for example, be a temperature sensor. There are arthropods that are active solely or preferably within a particular temperature range. Many species of bee cease to fly below 12° C. and preferably remain in the beehive. The temperature in the device of the invention or in the environment of the device thus correlates with the probability of encountering (specific) arthropods in the collecting region. Temperature sensors are available in various forms, for example in the form of a thermocouple, semiconductor temperature sensor, temperature sensor with crystal oscillator, pyrometer, thermal imaging camera and so forth.

The sensor may, for example, be a moisture sensor. There are arthropods that avoid rain. The probability that an arthropod will get into the device of the invention when it is raining is thus lower than in dry weather. The moisture sensor may be a measuring instrument for determination of air humidity (hygrometer). Examples of standard hygrometers are absorption hygrometers (e.g. hair hygrometers, spiral hygrometers, capacitive sensors, impedance sensors), psychrometers and optical hygrometers. Preference is given to using a capacitive sensor or an impedance sensor (resistive hygrometer). Also conceivable is a sensor for measurement of soil moisture content, in addition to or instead of the measurement of air humidity. Also conceivable is a sensor for measurement of precipitation (precipitation meter).

The sensor may, for example, be an air pressure sensor. There are arthropods that react to changes in air pressure (see, for example, F. Fournier et al.: *Effect of Barometric Pressure on Flight Initiation by Trichogramma pretiosum and Trichogramma evanescens*, Environmental Entomology, Vol. 34(6), 2005, pages 1534-1540; W. G. Wellington: The effects of variations in atmospheric pressure upon insects, Canadian Journal of Research, 1946, Vol. 24d, No. 2, pages 51-70). Specific changes in air pressure can therefore increase or reduce the probability of encountering a (specific) arthropod in the collecting region.

The sensor may, for example, be a wind sensor. Wind can exert an influence on the physiology and behavior of arthropods (see, for example, M. Chaudhry et al.: *Studying the Effects of Wind on Insects*, Poster, DOI: 10.13140/RG.2.1.3283.3521). In addition, the spread of arthropods can be influenced by wind (see, for example, S. Wiktelius: *Wind dispersal of insects*, Grana 20: 205-207, 1981, ISSN 0017-3134). The probability of finding a (specific) arthropod in the collecting region may thus correlate with the strength and/or direction and/or duration of wind.

The sensor may, for example, be a sensor for chemical substances in the air, for example a gas chromatograph (GC) or a mass spectrometer (MS) or a GC/MS combination. It is thus possible to detect, for example, substances that are released by plants in reaction to infestation with a pest (G. Witzany: Plant Communication from Biosemiotic Perspective, Plant Signal Behav. 2006 July-August; 1(4): 169-178; Signaling and Communication in Plant, Series Ed.: C. Garcia-Mata, Springer ISSN: 1867-9048).

The sensor may, for example, be a microphone. The microphone detects sounds and/or noises that are produced by a (specific) pest and/or by a (specific) beneficial. The sounds and/or noises can be used to detect the presence of a species (see, for example: *Detecting Insect Flight Sounds in the Field: Implications for Acoustical Counting of Mosquitoes*, Transactions of the ASABE, 2007, Vol. 50(4): 1481-1485).

The sensor may, for example, be part (preferably a photodiode or image sensor) of a light barrier. A light barrier is a system that recognizes the interruption of a light beam and indicates it as an electrical signal. In this way, it is possible to contactlessly detect moving objects. The light barrier may be mounted such that it detects an arthropod that gets into the collecting region. The light barrier may be mounted such that it detects an arthropod that gains access to the collecting region or to the device of the invention via an entrance. The term "light barrier" also includes light grids or light curtains that work with multiple (parallel) light beams.

The sensor may be a camera. The camera may comprise an image sensor and optical elements. The image sensor is a device for recording two-dimensional images from light by electrical means. This typically comprises semiconductor-based image sensors, for example CCD (CCD=charge-coupled device) or CMOS sensors (CMOS=complementary metal-oxide-semiconductor). The optical elements (lenses, stops and the like) serve for maximum sharpness of imaging of an object on the image sensor. The camera may be configured such that the collecting region or at least a portion thereof is imaged on the image sensor. The image sensor may be read out and analyzed by a control unit of the camera. Image analysis methods and/or machine-learning algorithms may be used to detect the presence of a (specific) arthropod in the collecting region. The camera may be the imaging unit of the device of the invention or a separate component.

The sensor may, for example, be a motion sensor. A motion sensor is an electronic sensor that detects motions in its immediate environment and can hence work as an electrical switch. A motion sensor can work actively with electromagnetic waves (HF, microwaves or Doppler radar), with ultrasound (ultrasound motion sensors), or passively, like a pyroelectric sensor, with electromagnetic radiation which is emitted by an object or its environment. The motion sensor may be configured such that it detects motion of a (specific) arthropod in the collecting region or in the environment of the collecting region.

According to some embodiments of the invention, the generation of images and/or the transmission of images and/or information regarding the images to a computer system is/are matched to the probability of a (specific) arthropod present within the collecting region.

According to some embodiments, the probability of an image being generated and/or an image generated and/or information regarding an image generated being transmitted by the device of the invention to a separate external computer system preferably rises with the probability of a (specific) arthropod present within the collecting region.

This has the advantage that fewer needless images on which no (specific) arthropod has been imaged are generated and/or transmitted. This has the advantage that the device of the invention consumes less energy. This has the advantage that the device of the invention need not be sought out so frequently in order to renew or charge the energy source. Moreover, fewer images depicting no (specific) arthropod are unnecessarily viewed and/or analyzed.

In a preferred embodiment, one or more images of the collecting region are generated when at least one sensor detects the presence of a (specific) arthropod (beneficial and/or pest) in the collecting region or in the entry region of the device. Preference is given to generating multiple images (e.g. 2, 3, 4, 5, 6, 7, 8, 9, 10 or more) in a time sequence (for example at an interval of 1 second, or 2 seconds or 3 seconds or 4 seconds or 5 seconds or at a different time interval).

In a further preferred embodiment, at least one image of the collecting region is then generated and the at least one image and/or information regarding the at least one image is transmitted to a computer system when at least one sensor detects the presence of a (specific) arthropod (beneficial and/or pest) in the collecting region or in the entrance region of the device.

In a further preferred embodiment, one or more images of the collecting region are generated and/or images and/or information regarding the images is/are transmitted to a computer system only when the probability of a (specific) arthropod being present within the collecting region exceeds a predefined threshold. The predefined threshold may, for example, be 30% or 40% or 50% or 75% or a different percentage.

In a preferred embodiment, multiple sensors are used and the generation of images and/or the transmission of images and/or information regarding the images is made dependent on the signals from the multiple sensors. For example, it is conceivable to use a first sensor (for example a timer or a brightness sensor) that ascertains whether it is day or night. Images are generated, for example, only at particular times of day or night or at particular brightnesses. A second sensor can ascertain the temperature, for example. Images are generated, for example, only within a particular temperature range. Further combinations are conceivable.

The device of the invention has an energy supply unit in order to supply the electronic components with electrical energy. The energy supply unit is preferably a mobile unit, for example an electrochemical cell (battery), an accumulator and/or a solar cell. Particular preference is given to a combination of a chargeable accumulator and a solar cell, in order to keep maintenance complexity low on the one hand (no battery change needed) and in order to be able to assure energy supply even in the case of few hours of sunlight on the other hand (a pure solar cell is reliant on a minimum of solar energy).

Each device is preferably assigned a location. This is typically the position where the respective device generates images. It may alternatively be a position in the environment of a device (for example the position of a base station to which the device is connected via a radio connection), or the position may be fuzzy in that, for example, a region on the Earth's surface where the device is present is specified (for example in the form of a circle with a defined radius).

In a preferred embodiment, the system of the invention has means of determining the position of the devices.

It is conceivable that the device has a GPS sensor (GPS: global positioning system) or another sensor of a global satellite navigation system (GNSS) with which the position of the device can be ascertained.

One advantage of determining position by means of a global satellite navigation system is high accuracy. Disadvantages are the additional component costs and the comparatively high energy demand.

It is also conceivable that a position is determined by means of the radio cell to which the transmitter unit of the device of the invention is connected. Such a solution typically has a lower accuracy than determination of position, but means lower component costs and a lower energy demand.

In mobile communications, the simplest way of determining position is based on the fact that the cell in which a transmitter unit is present is known. Since, for example, a switched-on mobile phone is connected to a base station, the position of the mobile phone can be assigned to at least one mobile communications cell (cell ID). It is also possible to proceed analogously with a device of the invention.

With the aid of GSM (*Global System for Mobile Communications*), the position of a transmitter unit can be determined accurately to several hundred meters. In towns, the position can be determined accurately to 100 to 500 m; in rural areas (in which the density of base stations is lower), the radius is increased to 10 km or more. If the information is combined with the TA parameter (TA: Timing Advance) via the cell ID, the accuracy can be increased. The higher this value, the greater the distance of the transmitter unit from the base station. It is possible to locate a transmitter unit even more accurately by the EOTD method (EOTD: Enhanced Observed Time Difference). This determines the differences in transit time of the signals between the transmitter unit and multiple receiver units.

In one embodiment, information is transmitted and the position is determined by means of the Sigfox grid. Sigfox is a low-power wide-area network (LPWAN) and is specifically designed for small data packets and very power-saving operation. Sigfox base stations can communicate over long distances without disruption. The range of a single base station, which can control up to one million transmitter units, is 3 to 5 km in areas of high population density and 30 to 70 km in rural areas. In the case of Sigfox, the data packets are received by all base stations in the transmitter region. This can be used to determine the position of a transmitter unit.

According to some embodiments, it is also conceivable that the position of a device of the invention is detected when it is registered. In such a case, one step of the registration is the association of device and position. It is conceivable that a user, by means of a mobile computer system (e.g. a smartphone or a tablet computer or the like), detects an unambiguous identifier of the device and associates it with position information. The unambiguous identifier serves for identification of the device when it is registered. The unambiguous identifier may be a number or an alphanumeric code or a binary code or the like which is mounted on the device or recorded (saved) in a data storage means of the device. The unambiguous identifier can be detected, for example, by input via an input device (e.g. a keyboard, a touch screen, a microphone (by speech input) or the like) into the mobile computer system. Preferably, the unambiguous identifier takes the form of an optically readable code (for example a barcode or matrix code or the like) or of an electronic storage means that can be read out by radio (e.g. in the form of an RFID tag) or the like. This has the advantage that the unambiguous identifier can be read out automatically with the mobile computer system, and input errors (as in the case of a user typing it in using a keyboard) are avoided. An optical code can be detected, for example, with a camera that may be part of the mobile computer system. In a further step, the position is determined. It is conceivable that the means of determining position are provided by the user's mobile computer system. The mobile computer system may, for example, be a smartphone with which the position is determined via the radio cell to which the smartphone is connected, or with a GPS sensor associated with the smartphone.

If the unambiguous identifier has been detected and the position determined, these pieces of information are associated with one another. The association assigns a position to the device. It is conceivable that the associated information is transmitted via a network to an external computer system and stored therein. It is also conceivable that the associated information is stored on the user's mobile computer system.

On registration, preference is given to additionally associating the unambiguous identifier of the device with an unambiguous identifier of the user, such that the user is assigned an individual device (or multiple devices) with a (respective) defined position. As a result of this association, the user is preferably able to receive only images from the device assigned to the user.

The information which is transmitted by the devices present (imaging devices and optionally plant analysis devices) by means of the corresponding transmitter units to a computer system can be processed, analyzed, archived and/or issued to a user therein.

A "computer system" is a system for electronic data processing that processes data by means of programmable computation rules. Such a system typically comprises a "computer", that unit which comprises a processor for performing logic operations, and also peripherals.

In computer technology, "peripherals" refer to all devices which are connected to the computer and serve for control of the computer and/or as input and output devices. Examples thereof are monitors (screen), printers, scanners, mice, keyboards, drives, cameras, microphones, loudspeakers, etc. Internal ports and expansion cards are also considered to be peripherals in computer technology.

Today's computer systems are frequently divided into desktop PCs, portable PCs, laptops, notebooks, netbooks and tablet PCs and so-called handhelds (e.g. smartphones); all these systems can be utilized for execution of the invention.

Inputs into the computer system are made via input devices, for example a keyboard, a mouse, a microphone and/or the like. "Input" shall also be understood to mean the selection of an entry from a virtual menu or a virtual list or clicking on a selection box and the like.

According to some embodiments, a system of the invention typically has a multitude (at least 10, preferably more than 20) devices of the invention that are assigned to a computer system.

The devices and the computer system are connected to one another via a network, such that the devices can transmit information ((sensor) data, images, status information or the like) to the computer system. According to some embodiments, it is also conceivable that the system of the invention is configured such that the computer system can transmit information or control commands to the devices. The network via which the computer system and the devices are connected to one another is at least partly a radio network. Typically, information is transmitted from a device via a transmitter unit by radio to a base station, from which it is passed onward (optionally via further stations) by radio and/or via cable to the computer system.

According to some embodiments, the system of the invention is configured such that the corresponding devices—set up or activated at a location—automatically generate images.

In one embodiment of the present invention, the devices transmit the images generated to the computer system. The images transmitted are analyzed on the computer system; this involves ascertaining the number of pests and/or beneficials present in the collecting region and identifying the species present.

In an alternative embodiment, the images generated are analyzed by an evaluation unit in the device of the invention. For example, it is possible to ascertain the number of pests/beneficials present in the collecting region. This number can then be transmitted to the computer system. It is possible to identify the species present. The names of the species can then be transmitted to the computer system. It is conceivable that the images generated are likewise transmitted to the computer system. It is conceivable that an image generated is transmitted to the computer system together with the result of the analysis. It is conceivable that the images generated are transmitted to the computer system only after a request by a user.

According to some embodiments, it is conceivable that the signals generated by one or more sensors in the device of the invention or information regarding the signals from the device of the invention are also transmitted to the computer system via the network.

The analysis of the images may serve to ascertain whether an organism depicted in an image is a pest, a beneficial or an organism of no significance to the growing of crop plants. Accordingly, identification may mean assignment to the three categories: "harmful", "beneficial" and "neutral". The identification of a pest preferably serves to identify measures that can be taken against the pest. A measure to be taken may, for example, be the application of a particular pest control means.

Identification may alternatively be understood to mean the assignment of individual pests/beneficials to a taxon, i.e. assignment to a class, order, superfamily, family, subfamily, tribe, genus, species, subspecies or to an intermediate stage for the purposes of biological taxonomy.

In the identification of beneficials, the aim may be to identify those beneficials for which a pest present in an area serves as food source or host.

The identification and counting of the pests/beneficials is preferably automated. This means that a user does not have to count and identify the arthropods in an image themself; instead, the respective image is sent to image processing and image recognition algorithms by a computer program in a working memory of a computer system. With the aid of these algorithms, the image is analyzed and optionally prepared (filtrations and similar operations), and features that permit a conclusion as to how many arthropods are present and their species are extracted. Such algorithms are described in the prior art.

It is conceivable to identify pests/beneficials using an artificial neural network that has been trained beforehand on a multitude of images of known pests/beneficials.

Preference is given to using further information for identification of the pests/beneficials. For example, it is possible to utilize the geo-position. If the respective imaging device is in Germany, for example, different pests/beneficials will be considered than if the imaging device is in Brazil, for example. The current season is also an important piece of information that can be utilized. According to the season, different pests/beneficials can appear. It is alternatively possible for the plants being grown (crop plants, protective plants, sacrificial plans) to give information as to the pest/beneficial harmful organism. In addition, the signals generated by one or more sensors of the device of the invention can be employed for identification.

According to some embodiments, it is conceivable that a system of the invention comprises two computer systems (a first and a second computer system). The first computer system is a server connected to a multitude of devices of the invention via a network. This server receives all the information transmitted by the devices (e.g. images, analysis results, status messages and the like). The information can be analyzed and archived on the server. For example, analysis of the images can take place on the server. The second computer system (client) is connected to the first computer system (server) and can request information (images, analysis results and the like). The second computer system is typically operated by an end user (for example a farmer) who has set up one or more devices, for example in one of the farmer's agriculturally utilized fields, and would like to conduct an infestation check. The first computer system (server) is then typically operated and managed by the operator of the image analysis tools. This operator is able to use the multitude of images from different end users for constant improvement of the algorithms for counting of the pests/beneficials and/or for identification of species. The system is preferably configured such that the user of the second computer system can receive only images from the first computer system that come from devices registered to that user.

In a preferred embodiment, in a field with one or more devices, the arthropods present in the collecting region(s) are identified. In a next step, an analysis is made as to whether pests and their counterpart beneficials for which the pests identified serve as food or host are present among the arthropods identified. If such beneficials and/or pests are present, their number is determined. These numbers are compared in order to see whether the beneficials alone are capable of preventing uncontrolled reproduction and/or spread of the pests. The numbers are preferably expressed in relation to one another. The ratio of the number of pests to their counterpart beneficials is compared to an empirically ascertained threshold. If the ratio is less than the threshold, there is no expectation of uncontrolled reproduction and/or spread of the pests. If the ratio is greater than the threshold, measures should be taken to avoid a greater loss of yield. The result of the comparison can be displayed to a user, preferably the farmer of the field in question. A measure for controlling the pests is preferably additionally recommended to the user. For the recommendation, the nomination of a crop protection product (for example an insecticide), the amount of crop protection product to be deployed, a favorable period for deployment of the crop protection product and the like may be indicated.

In a further preferred embodiment, in a field with one or more devices, the arthropods present in the collecting region(s) are identified. In a next step, an analysis is made as to whether pests and beneficials are present among the arthropods identified. If such beneficials and pests are present, their respective number is determined. A model is used to calculate what effects control of the pests, for example with an insecticide, could have on the beneficials. It is calculated whether the adverse effects on the beneficials outweigh the positive effects resulting from control of the pests. If the adverse effects on the beneficials are predominant, advice is given against control of pests and/or the interval is increased.

In a further preferred embodiment, the infestation density with a specific pest is ascertained for an area. It is ascertained whether a damage threshold has been exceeded. In clarifying whether the damage threshold has been exceeded, preference is given to taking account of information relating to plant status (health of the plants, stage of development, expected yield). In clarifying whether the damage threshold has been exceeded, preference is given to taking account of information relating to beneficials present (species and number of beneficials present). The result is displayed to a farmer of the area. If the damage threshold has been exceeded, measures that the farmer can take to reduce the expected damage are recommended.

In many areas, green margins adjoining a field for crop plants are grown in order to increase biodiversity. It is conceivable that a farmer wishes to verify the effectiveness of the green margins and/or has to demonstrate it to an official body. In a preferred embodiment, therefore, by means of the imaging devices present in an area, the number and species of the beneficials that occur in the area or the number of one or more defined beneficial species is ascertained. The data ascertained are used to ascertain area densities for one or more beneficial species (for example number of beneficial species per hectare). The area densities are transmitted and displayed to the farmer of the area and/or to an official body.

According to some embodiments, the present invention further provides a computer program product. The computer program product comprises a computer program which is preferably loaded into a working memory of the control unit of a device of the invention, where it triggers the control unit to execute the following steps:

receiving a signal, wherein the signal includes information as to the probability that an arthropod is present in a collecting region, controlling the generation of images of the collecting region and the sending of the images and/or of information regarding the images via a network to a computer system, wherein the times and/or the frequency in time for the generation of the images of the collecting region and/or for the sending of the images and/or the information regarding the images via a network to a computer system is/are fixed depending on the probability that arthropods are present in the collecting region.

BRIEF DESCRIPTION OF THE DRAWINGS

The invention is described in detail hereinafter, by way of example only, with reference to figures and examples, without any intention to restrict the invention to the features and combinations of features specified in the figures and examples.

The Figures Show.

DETAIL DESCRIPTION OF EXEMPLARY EMBODIMENTS

Figure 1:
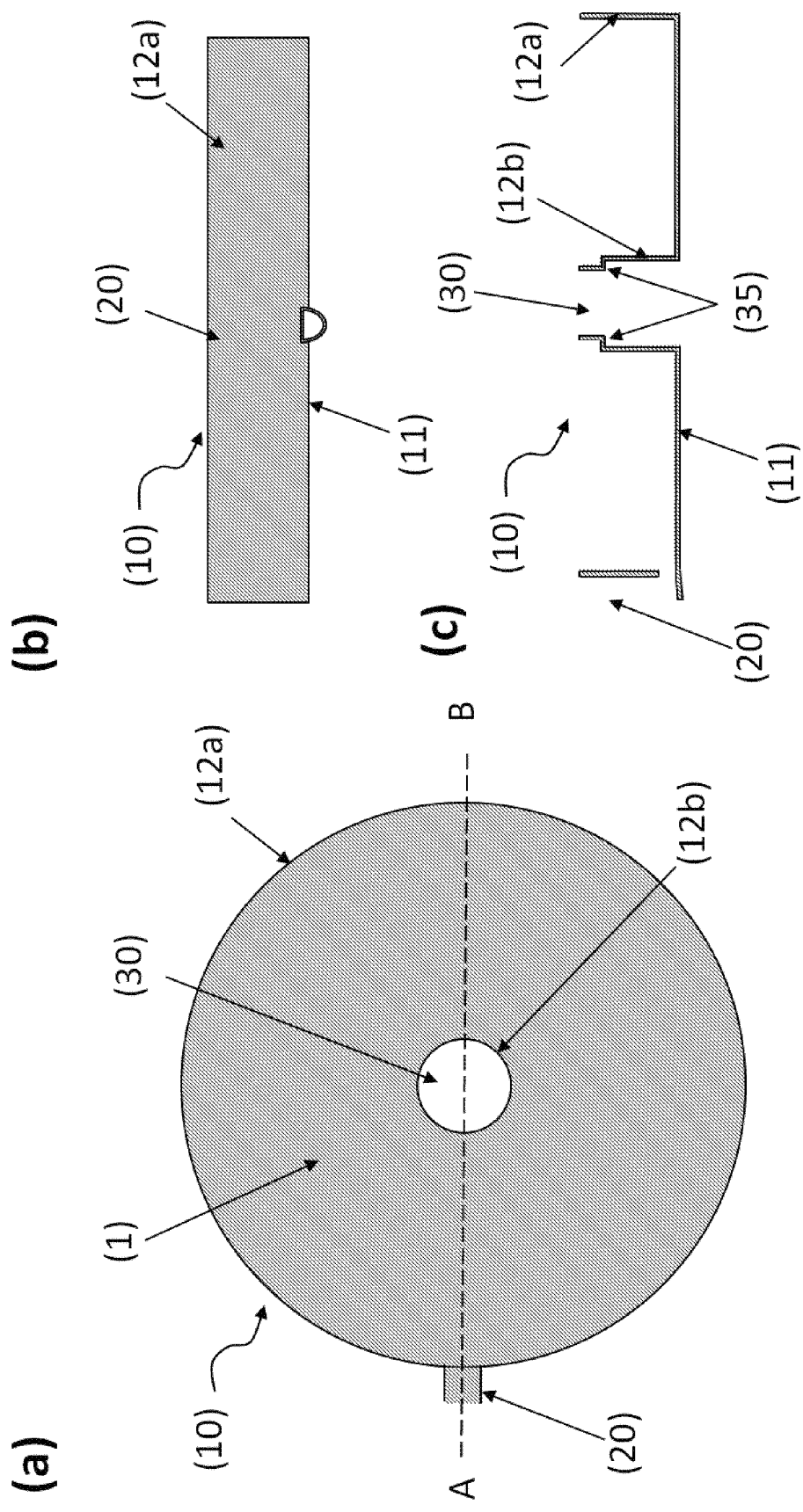
FIG. 1 shows a schematic of a vessel that provides a collecting region for pests and/or beneficials.

FIG. 1 shows a schematic of a vessel (10) that provides a collecting region (1) for pests and/or beneficials.

FIG. 1(a) shows the vessel (10) in a top view. FIG. 1(b) shows the vessel (10) in a side view from the direction of point A (see FIG. 1(a)). FIG. 1(c) shows the vessel (10) from the side in cross section along the dotted line A-B (see FIG. 1(a)).

The vessel (10) has a cylindrical shape with a round cross section. The cylinder is closed at the bottom by a base (11); it is open at the top. The base (11) and two concentric side walls (12a, 12b) that extend perpendicularly to the base (11)

form a space. The collecting region (1) is viewed from the top. A circular recess (30) delimited by the side wall (12b) is introduced into the middle of the vessel (10). The recess narrows in the upward direction, forming a ring (35) that can serve as contact surface for a holder.

A semicircular recess is introduced into the side wall (12a) of the vessel (10) at one point, at which a channel (20) points outward. Rain water that gets into the vessel (10) can flow away via this channel.

Figure 2:
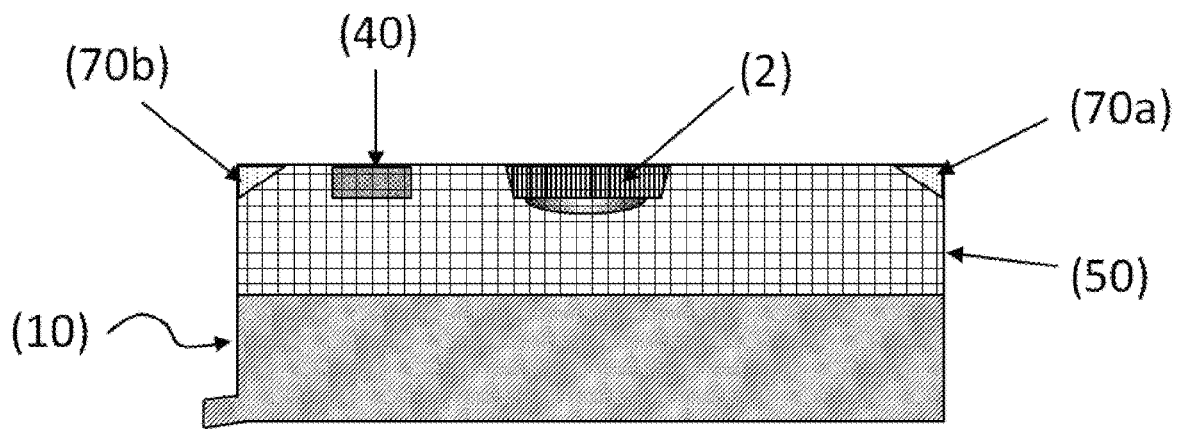
FIG. 2 shows a vessel over which a cage has been mounted.

FIG. 2 shows the vessel (10) illustrated in FIG. 1(b), over which a cage (50) has been mounted. The dimensions of the grid spacing of the cage (50) here are such that no leaves get into the vessel. An imaging unit (2) is mounted at the top of the grid (50). The imaging unit (2) is within the cage. Two lighting units (70a, 70b) ensure defined illumination of the collecting region. A sensor (40) measures a physical property that correlates with the probability that a (specific) arthropod will be present in the collecting region.

Figure 3:
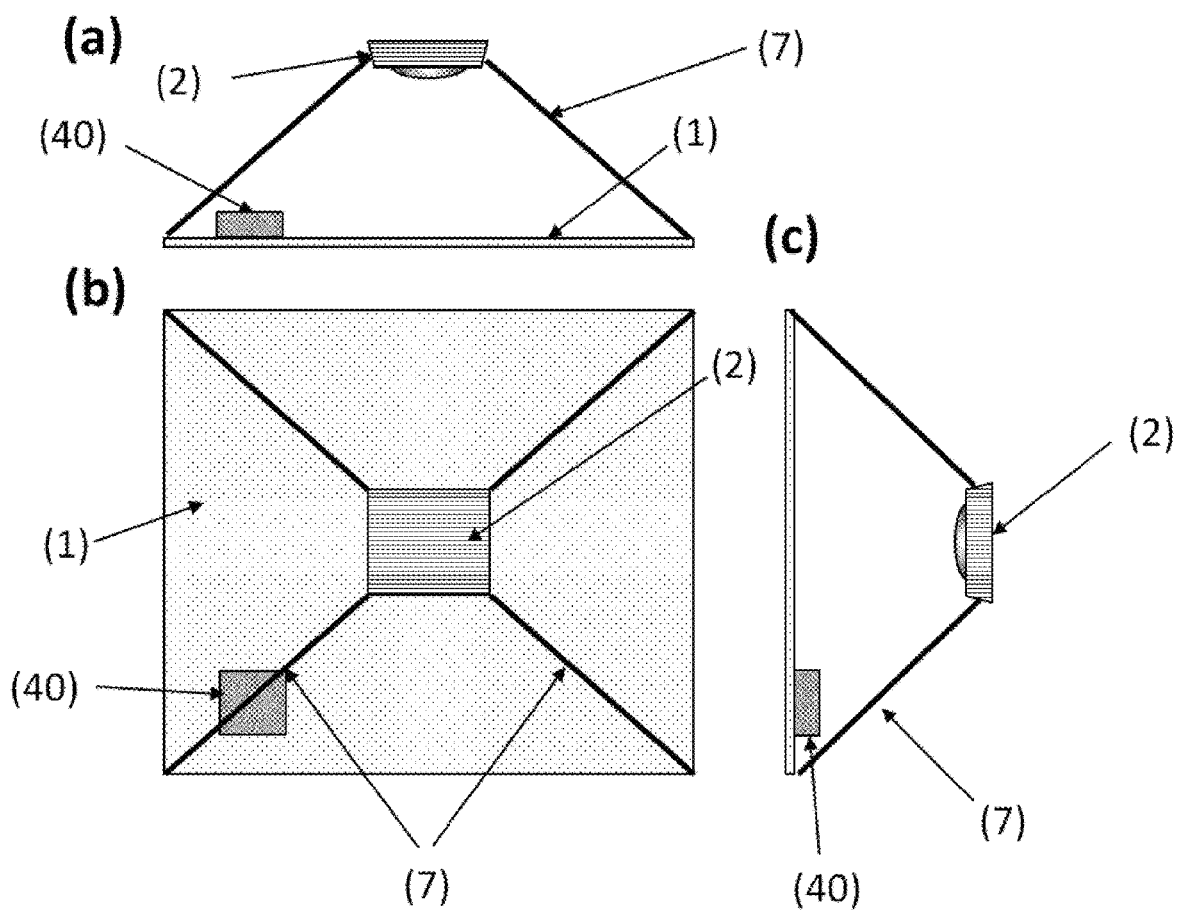
FIG. 3 shows a schematic of a tablet that provides a collecting region.

FIG. 3 shows a schematic of a tablet that provides a collecting region (1). FIG. 3(a) shows the tablet in a side view. FIG. 3(b) shows the tablet in top view. FIG. 3(c) shows the card in a further side view. On the card are mounted holding bars (7), at the end of which is secured an imaging unit (2). A sensor (40) present in the collecting region (1) measures a physical property that correlates with the probability that a (specific) arthropod will be present in the collecting region.

Figure 4:
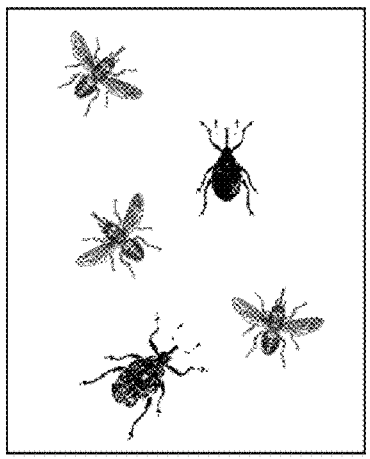
FIG. 4 shows a schematic of one embodiment of device (A)
Figure 4:
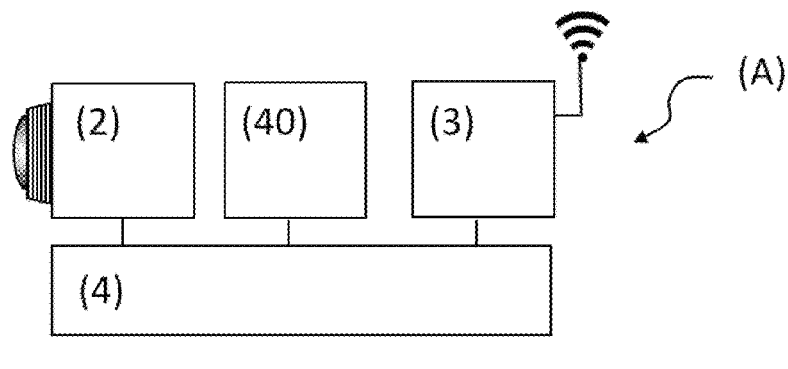

FIG. 4 shows a schematic of one embodiment of the device (A) of the invention. The device (A) comprises a collecting region (1), an imaging unit (2), a sensor (40), a transmitter unit (3) and a control unit (4).

Figure 5:
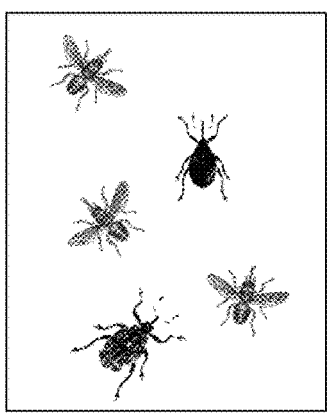
FIG. 5 shows a schematic of a further embodiment of device (A)
Figure 5:
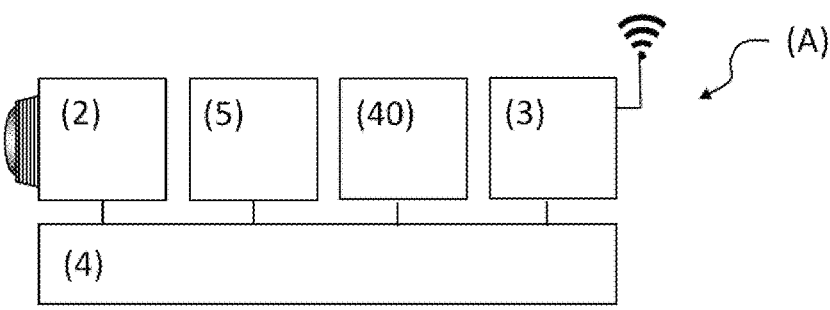

FIG. 5 shows a schematic of a further embodiment of the device (A) of the invention. The device (A) comprises a collecting region (1), an imaging unit (2), a sensor (40), a transmitter unit (3), a control unit (4) and an evaluation unit (5).

Figure 6:
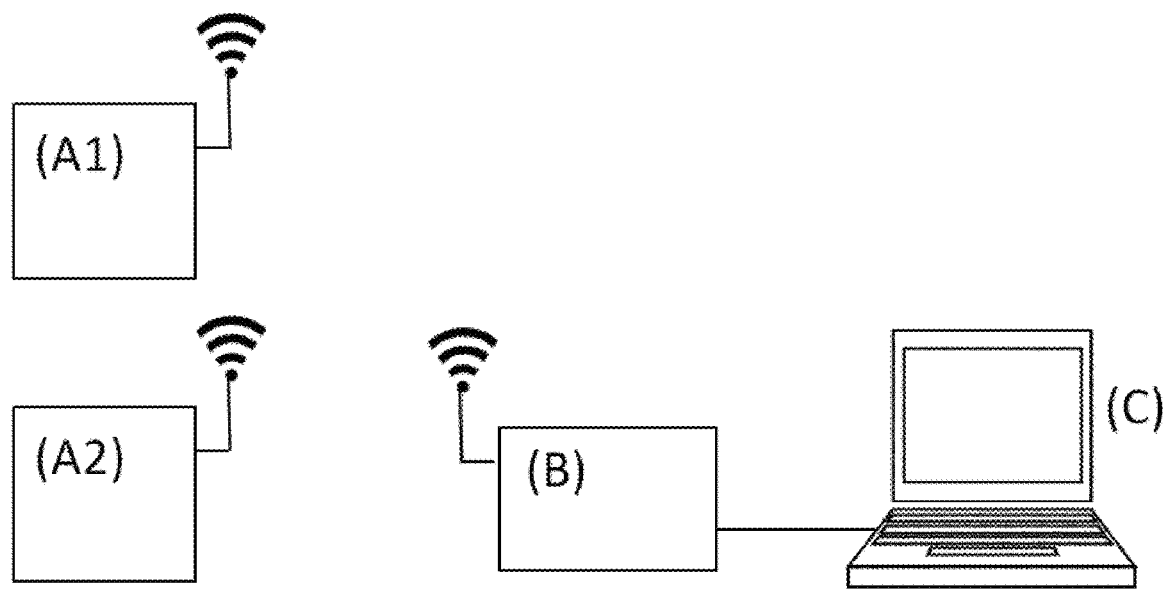
FIG. 6 shows schematically one embodiment of a system.

FIG. 6 shows schematically one embodiment of the system according to the invention. The system comprises a multitude of devices (A1, A2) of the invention that generate images. Information relating to the images is transmitted via a radio network to a base station (B). The information is transmitted from there via a network to a computer system (C).

Figure 7:
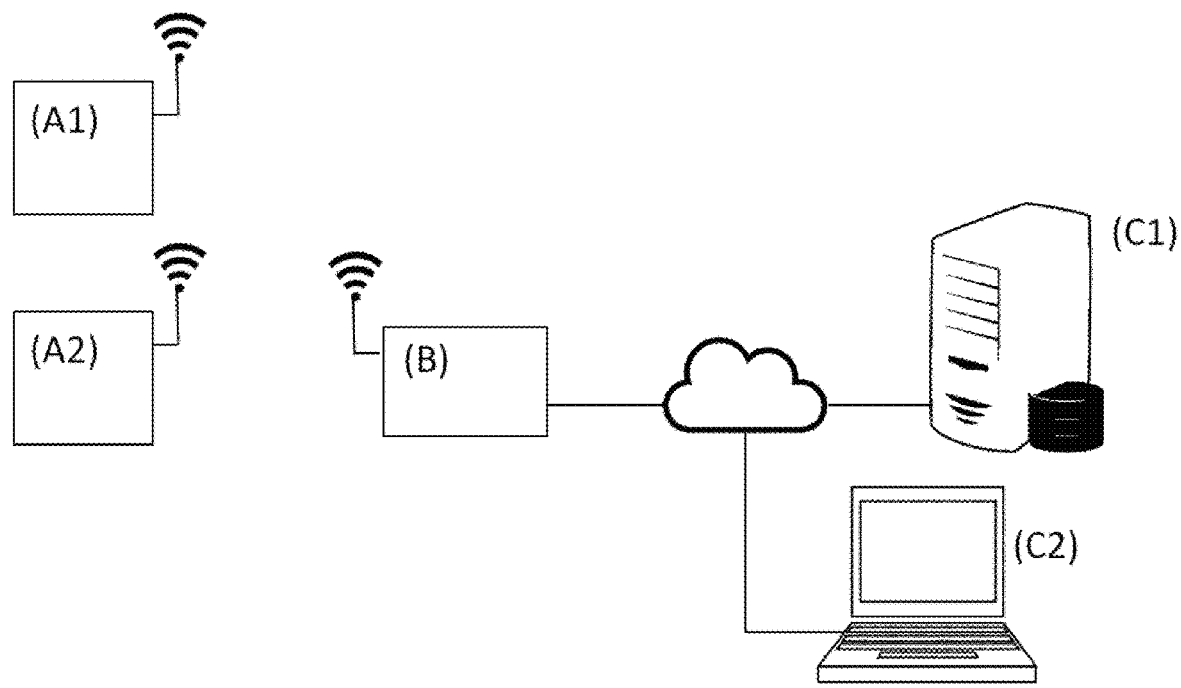
FIG. 7 shows schematically a further embodiment of a system.

FIG. 7 shows schematically a further embodiment of the system according to the invention. The system comprises a multitude of devices (A1, A2) of the invention that generate images. Information relating to the images is transmitted via a radio network to a base station (B). The information is transmitted from there via a network (represented by the cloud) to a computer system (C1). Information relating to the images can be called up from the computer system (C1) by means of the computer system (C2).

The invention claimed is:

1. A device comprising:
   a collecting region for receiving an arthropod;
   an imaging sensor for generating images of the collecting region;
   a transmitter for sending image data from the imaging sensor to a computer system via a network, wherein the image data comprises one or more of: the generated images and information associated with the generated images;
   a physical property sensor for detecting a physical property of an environment in a vicinity of the collecting region, wherein the physical property sensor is part of a light barrier, wherein breaking of the light barrier indicates the presence of the arthropod in the collecting region or breaking of which indicates entrance and/or exit of the arthropod into/out of the device via an opening in the device; and
   a control unit configured to:
      receive a signal comprising the physical property of the environment in the vicinity of the collecting region from the physical property sensor;
      interpret the signal to determine whether the physical property is indicative of a presence of the arthropod in the collecting region;
      control the imaging sensor and the transmitter in response to the interpretation of the signal wherein controlling the imaging sensor and the transmitter comprises adjusting one or more of: a time at which the images are generated by the imaging sensor, a frequency in which the images are generated by the imaging sensor, a time at which the image data is sent to the computer system by the transmitter, and a frequency in which the image data is sent to the computer system by the transmitter,
   wherein the control unit is configured to increase the frequency in which images of the collecting region are generated by the imaging sensor if the interpretation of the signal by the control unit indicates that there is an increased probability that an arthropod is present in the collecting region.

2. The device of claim 1, wherein the signal indicates occurrence of an event and the control unit is configured to trigger generation of one or more images of the collecting region on occurrence of the event.

3. The device of claim 2, wherein the event is an exceedance of a predefined threshold of the physical property or the undershooting of a predefined threshold of the physical property.

4. The device of claim 1, wherein the physical property sensor is a brightness sensor.

5. The device of claim 1, wherein the physical property sensor is a temperature sensor.

6. The device of claim 1, wherein the physical property sensor is a moisture sensor.

7. The device of claim 1, wherein the physical property sensor is an air pressure sensor.

8. The device of claim 1, wherein the physical property sensor is a wind sensor.

9. The device of claim 1, wherein the physical property sensor is a sensor for detection of chemical substances in the air.

10. The device of claim 1, wherein the physical property sensor is a microphone.

11. The device of claim 1, wherein the physical property sensor is a camera, wherein the camera comprises the imaging sensor, wherein at least part of the collecting region is imaged on the image sensor, and wherein the camera is configured to read the imaging sensor, to analyze the image read, and to recognize one or more of: a beneficial, a pest, a specific beneficial, and a specific pest.

12. The device of claim 1, wherein the physical property sensor is a movement sensor configured to indicate a movement of a body within the collecting region and/or within an entry region to the device.

13. The device of claim 1, comprising at least a second physical property sensor.

14. A system comprising the device of claim 1 and a computer system, wherein the device and the computer system are connected to one another via a network.

15. A method comprising:
using a physical property sensor, detecting a physical property of an environment in a vicinity of a collecting region for receiving an arthropod;
generating images of the collecting region using an imaging sensor;
sending image data from the image sensor via a network to a computer system using a transmitter, wherein the image data comprises one or more of: the generated images and information associated with the generated images;
receiving a signal comprising the physical property of the environment in the vicinity of the collecting region from the physical property sensor at a control unit for controlling the imaging sensor and the transmitter, wherein the physical property sensor is part of a light barrier, wherein breaking of the light barrier indicates the presence of the arthropod in the collecting region or breaking of which indicates entrance and/or exit of the arthropod into/out of the device via an opening in the device;
interpreting, using the control unit, the signal detected by the physical property sensor to determine whether the physical property is indicative of a presence of an arthropod in the collecting region;
controlling the imaging sensor and the transmitter in response to the interpretation of the signal, wherein controlling the imaging sensor and the transmitter comprises adjusting, with a control unit, one or more of: a time at which the images are generated by the imaging sensor, a frequency in which the images are generated by the imaging sensor, a time at which the image data is sent to the computer system by the transmitter, and a frequency in which the image data is sent to the computer system by the transmitter; and
increasing the frequency in which images of the collecting region are generated by the imaging sensor if the interpretation of the signal by the control unit indicates that there is an increased probability that an arthropod is present in the collecting region.

16. A non-transitory computer readable storage medium storing one or more programs, the one or more programs comprising instructions which when executed by an electronic device, cause the electronic device to:
receive a signal from a physical property sensor, wherein the signal comprises a physical property of an environment in a vicinity of a collecting region for receiving an arthropod, wherein the physical property sensor is part of a light barrier, wherein breaking of the light barrier indicates the presence of the arthropod in the collecting region or breaking of which indicates entrance and/or exit of the arthropod into/out of the device via an opening in the device;
interpret the signal detected by the physical property sensor to determine whether the physical property is indicative of a presence of an arthropod in the collecting region;
control, in response to the interpretation of the signal, an imaging sensor for generating images of the collecting region and a transmitter for sending image data to a computer system via a network, wherein the image data comprises one or more of: the generated images and information associated with the generated images, and wherein controlling the imaging sensor and the transmitter comprises adjusting one or more of: a time at which the images are generated by the imaging sensor, a frequency in which the images are generated by the imaging sensor, a time at which the image data is sent to the computer system by the transmitter, and a frequency in which the image data is sent to the computer system by the transmitter; and
increase the frequency in which images of the collecting region are generated by the imaging sensor if the interpretation of the signal by the control unit indicates that there is an increased probability that an arthropod is present in the collecting region.

* * * * *